Patented Mar. 31, 1925.

1,531,507

UNITED STATES PATENT OFFICE.

BENJAMIN ROSENBAUM, OF BUFFALO, NEW YORK, ASSIGNOR TO NATIONAL ANILINE & CHEMICAL COMPANY, INC., OF NEW YORK, N. Y., A CORPORATION OF NEW YORK.

MANUFACTURE OF BENZALDEHYDE-2.5-DISULFONIC ACID.

No Drawing.   Application filed July 24, 1922. Serial No. 577,195.

*To all whom it may concern:*

Be it known that I, BENJAMIN ROSENBAUM, a citizen of the United States, residing at Buffalo, in the county of Erie, State of New York, have invented certain new and useful Improvements in the Manufacture of Benzaldehyde-2.5-Disulfonic Acid; and I do hereby declare the following to be a full, clear, and exact description of the invention, such as will enable others skilled in the art to which it appertains to make and use the same.

This invention relates to improvements in the manufacture of benzaldehyde-2.5-disulfonic acid from 2-chlorbenzaldehyde-5-sulfonic acid.

Benzaldehyde-2.5-disulfonic acid or its salts has been heretofore obtained by heating 2-chlorbenzaldehyde-5-sulfonic acid in a closed vessel or autoclave at an elevated temperature (around 180–200° C.) with aqueous solutions of either sodium bisulfite or normal sodium sulfite.

The present invention is based upon the discovery that benzaldehyde-2.5-disulfonic acid can be easily obtained, in excellent yields and of good quality, by heating an aqueous solution of the sodium salt of 2-chlorbenzaldehyde-5-sulfonic acid with normal sodium sulfite at the boiling temperature at ordinary atmospheric pressure. The invention includes the further discovery that the yield can be somewhat increased if a relatively small amount of sodium bisulfite is used in addition to the neutral sodium sulfite. The conversion of the 2-chlorbenzaldehyde-5-sulfonic acid into benzaldehyde-2.5-disulfonic acid can advantageously be carried out under re-fluxing conditions, with condensation and return of the water vaporized.

The amount of sodium sulfite used is capable of some variation, but the maximum conversion appears to be obtained by the use of about three mols of the normal sodium sulfite with one mol of 2-chlorbenzaldehyde-5-sulfonic acid and $\frac{3}{10}$ mol of sodium bisulfite, the amount of sodium bisulfite being about 10% by weight of the normal sodium sulfite employed.

The 2-chlorbenzaldehyde-5-sulfonic acid used in the manufacture of benzaldehyde-2.5-disulfonic acid, according to the present invention, can be advantageously prepared according to the following specific example, but it will be understood that the 2-chlorbenzaldehyde-5-sulfonic acid can be produced by other suitable methods. The parts are by weight.

To 292 parts of fuming sulfuric acid, containing 26 per cent of free sulfuric anhydride, cooled to a temperature of 15° C., there are introduced 150 parts orthochlorbenzaldehyde, the mixture being well agitated and care being taken, by cooling, that the temperature does not rise above 25° C. After all of the orthochlorbenzaldehyde has been added, there are slowly added 200 parts fuming sulfuric acid, containing 60 per cent of free sulfuric anhydride, the temperature of the mixture being still maintained at or below 25° C. The mixture, under agitation, is then heated to 80°–85° C. and maintained at this temperature until the sulfonation is substantially complete as shown by a test sample giving a clear solution when added to dilute aqueous ammonia. The reaction mixture is then poured, with stirring, onto 750–800 parts of ice and then subjected to steam distillation in an atmosphere containing carbon dioxide, obtained by slowly adding during the distillation a solution of sodium carbonate, in order to recover a small amount (around 2 to 5 per cent) of orthochlorbenzaldehyde which is usually present, and which has escaped sulfonation. The hot, residual solution is then diluted with hot water to about 2000 parts and neutralized by the addition of sodium carbonate, litmus being used as the indicator. During the neutralization, the temperatue of the solution is kept at about 65°–70° C. in order to prevent either sodium sulfate or 2-chlorbenzaldehyde-5-sulfonic acid (either as free acid or sodium salt) from crystallizing out of solution. About 465–470 parts of dry sodium carbonate are usually required to effect neutralization.

The solution of the sodium salt of 2-chlorbenzaldehyde-5-sulfonic acid thus obtained can be used directly for subsequent treatment in the manufacture of benzaldehyde-2.5-disulfonic acid. The method of treatment is illustrated by the following specific example, but the invention is not limited thereto.

To the neutral and well stirred solution, prepared as above described, there are added 1770 parts of a 20% neutral solution of sodium sulfite (neutral to phenolphthalein) and then 35.5 parts of dry powdered sodium bisulfite, and the mixture is heated to boiling under a reflux condenser at atmospheric pressure until the reaction is complete as indicated by no further increase in the amount of sodium chloride formed. When the reaction is complete, the solution is acidified by the addition of concentrated sulfuric acid and then boiled until the excess of sulfurous acid is expelled. The solution thus obtained, and which contains chiefly benzaldehyde-2.5-disulfonic acid and sodium sulfate, may be treated in any suitable and well known manner for the isolation of the benzaldehyde-2.5-disulfonic acid, or the solution may be employed directly in the production of triphenylmethane coloring matters of the malachite green series by condensing the benzaldehyde-2.5-disulfonic acid with alkylated aromatic amines or their derivatives and subsequently oxidizing the leuco dyes thus obtained to the corresponding coloring matters.

In the process of the present invention it will be seen that neither high temperatures nor high pressures are used to bring about the reaction and that closed vessels or autoclaves are unnecessary, and that the conversion of 2-chlorbenzaldehyde-5-sulfonic acid into benzaldehyde-2.5-disulfonic acid is carried out in aqueous media at the boiling temperature and under refluxing conditions at ordinary atmospheric pressure. Excellent yields are nevertheless obtained and the benzaldehyde-2.5-disulfonic acid is of sufficient purity to permit its direct use, without isolation, in the manufacture of triphenylmethane dyestuffs.

The reaction can be brought about using normal sodium sulfite alone, but somewhat more by-products appear to be formed than when a little sodium bisulfite is also used. It is accordingly advantageous to make use of a small amount of sodium bisulfite in addition to the normal sodium sulfite, and somewhat larger yields of the benzaldehyde-2.5-disulfonic acid can be thus obtained. The amount of sodium bisulfite used, however, is not sufficient to give to the charge an acid reaction (i. e. acid to litmus).

I claim:

1. The process of making a salt of benzaldehyde-2.5-disulfonic acid, which comprises heating a salt of 2-chlorbenzaldehyde-5-sulfonic acid with alkali sulfite in the presence of water under ordinary atmospheric pressure.

2. The process of making a sodium salt of benzaldehyde-2.5-sulfonic acid, which comprises heating the sodium salt of 2-chlorbenzaldehyde-5-sulfonic acid with normal sodium sulfite in the presence of water at the boiling temperature of the mixture under atmospheric pressure.

3. The process of making a sodium salt of benzaldehyde-2.5-disulfonic acid, which comprises heating the sodium salt of 2-chlorbenzaldehyde-5-sulfonic acid with normal sodium sulfite in the presence of water and sodium sulfate at boiling temperatures under a reflux condenser and at ordinary atmospheric pressures 4. The process of making a sodium salt of benzaldehyde-2.5-disulfonic acid, which comprises heating to the boiling temperature the neutral sodium salt of 2-chlorbenzaldehyde-5-sulfonic acid with sodium sulfite containing sodium bisulfite in the presence of water under atmospheric pressure.

5. The process of making the sodium salt of benzaldehyde-2.5-disulfonic acid which comprises heating the sodium salt of 2-chlorbenzaldehyde-5-sulfonic acid with normal sodium sulfite and sodium bisulfite in the presence of water, the heating being carried out at the boiling temperature of the mixture at atmospheric pressure, and the amounts of sodium sulfite and sodium bisulfite being approximately three mols of sodium sulfite and three-tenths of a mol of sodium bisulfite to one mol of the sodium salt of 2-chlorbenzaldehyde-5-sulfonic acid.

6. In a process of producing a salt of benzaldehyde-2.5-disulfonic acid by subjecting a salt of 2-chlorbenzaldehyde-5-sulfonic acid to the action of normal sodium sulfite in the presence of water, the improvement characterized by causing the reaction to occur at a temperature about the boiling-point of the mixture and under approximately atmospheric pressure.

7. In a process of producing a salt of benzaldehyde-2.5-disulfonic acid, wherein a salt of 2-chlorbenzaldehyde-5-sulfonic acid is heated with normal sodium sulfite in the presence of water, the improvement which comprises adding, before the heating operation, sodium bisulfite.

8. In a process of producing a salt of benzaldehyde-2.5-disulfonic acid, wherein a salt of 2-chlorbenzaldehyde-5-sulfonic acid is heated with normal sodium sulfite in the presence of water at about the boiling temperature under atmospheric pressure, the improvement which comprises adding, before the heating operation, an amount of sodium bisulfite equal to about ten percent by weight of the normal sodium sulfite employed.

9. In a process of producing a salt of benzaldehyde-2.5-disulfonic acid by subjecting a salt of 2-chlorbenzaldehyde-5-sulfonic acid to the action of an alkali metal sulfite in the presence of water, the improvement characterized by causing the reaction to occur at approximately atmospheric pressures.

10. The process of making a salt of benzaldehyde-2.5-disulfonic acid, which comprises heating under approximately ordinary atmospheric pressure a salt of 2-chlorbenzaldehyde-5-sulfonic acid with a mixture of alkali metal sulfite, alkali bisulfite and alkali metal sulfate in the presence of water.

11. In a process of producing a salt of benzaldehyde-2.5-disulfonic acid, wherein a salt of 2-chlorbenzaldehyde-5-sulfonic acid is heated under approximately atmospheric pressure with sodium sulfite in the presence of water and sodium sulfate, the improvement which comprises adding, before the heating operation, sodium bisulfite.

In testimony whereof I affix my signature.
BENJAMIN ROSENBAUM.